(12) United States Patent
Shen et al.

(10) Patent No.: US 7,596,179 B2
(45) Date of Patent: Sep. 29, 2009

(54) REDUCING THE RESOLUTION OF MEDIA DATA

(75) Inventors: Bo Shen, Fremont, CA (US); Sumit Roy, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 10/085,684

(22) Filed: Feb. 27, 2002

(65) Prior Publication Data

US 2003/0161401 A1 Aug. 28, 2003

(51) Int. Cl.
*H04N 7/12* (2006.01)
*G06K 9/46* (2006.01)

(52) U.S. Cl. .................... 375/240.16; 382/236
(58) Field of Classification Search .......... 348/410, 348/412, 424, 392, 409, 415, 419, 413, 416, 348/420, 410.1; 375/240.24, 240.16, 240.21, 375/240.25, 240.03, 240.04, 240.07, 240.13, 375/240.18, 240.12; 382/232, 236, 239
See application file for complete search history.

(56) References Cited

U.S. PATENT DOCUMENTS 5,644,361 A * 7/1997 Ran et al. ............ 375/240.16
5,825,927 A * 10/1998 Boyce et al. ............. 382/232
5,973,739 A * 10/1999 Nilsson ................. 375/240.1
6,018,368 A * 1/2000 Kim et al. ................ 348/416
6,487,249 B2 11/2002 Kim et al. ............ 375/240.21
6,647,061 B1 * 11/2003 Panusopone et al. ... 375/240.12
6,671,322 B2 * 12/2003 Vetro et al. ........... 375/240.16
6,704,358 B1 * 3/2004 Li et al. ................ 375/240.02
6,798,837 B1 * 9/2004 Uenoyama et al. ..... 375/240.16
6,950,464 B1 * 9/2005 Shen et al. ............ 375/240.03
7,170,932 B2 * 1/2007 Vetro et al. ................. 375/240
2002/0126752 A1 * 9/2002 Kim ..................... 375/240.03
2003/0021345 A1 * 1/2003 Brusewitz .............. 375/240.24
2004/0013195 A1 * 1/2004 Panusopone et al. ..... 375/240.2

* cited by examiner

*Primary Examiner*—Behrooz Senfi (57) ABSTRACT

A method and system for reducing the resolution of media data. Input data at a first resolution are received from a source. The input data are compressed. The input data can be downsampled to generate compressed downsampled data at a reduced resolution. The compressed downsampled data can be used to generate a frame at the reduced resolution. When the frame is needed as a reference for another frame, the compressed downsampled data can be decoded to generate decompressed downsampled data at the reduced resolution. The decompressed downsampled data can be upsampled to generate decompressed data at a resolution corresponding to the first resolution. Thus, a larger amount of data can be processed while the data are compressed. As such, data processing operations such as transcoding can be accomplished quickly and effectively while saving computing resources.

27 Claims, 6 Drawing Sheets

REDUCING THE RESOLUTION OF MEDIA DATA

TECHNICAL FIELD

Embodiments of the present invention relate to the field of streaming media data. More specifically, embodiments of the present invention relate to reducing the resolution of media data.

BACKGROUND ART

Wireless (as well as wired) networks are able to provide increasingly rich media content to client devices. However, a limitation of some client devices, particularly mobile client devices, is that these devices may not have the resources (e.g., the display real estate) to render the rich content that is traditionally created for more resourceful devices such as desktop computers or DVDs (digital video disks). Moreover, the spectrum of client devices that are available have widely varying capabilities and attributes; that is, a network typically must serve a heterogeneous mix of devices. Furthermore, a wireless network typically has less bandwidth than a conventional wired network. Therefore, there is a need to adapt the original media content to the attributes of a receiving client device as well as to the capabilities of the network. This function is performed by network nodes commonly referred to as transcoders.

A transcoder takes a compressed, high resolution, high bit rate media stream as input, then processes it to produce another compressed media stream, at a reduced resolution and bit rate, as output. The original content may have been coded at, for example, a resolution of 720×480 pixels and a bit rate of two to eight Mbps for DVDs, or at a resolution of 320×240 pixels and a bit rate of 1.5 Mbps for desktop clients connected to the Internet through a T1 line. However, due to the characteristics of mobile communication (e.g., lower bandwidth channels and limited display capabilities), lower bit rates and reduced resolution are desired.

A straightforward method for transcoding media content is to decode (decompress) the original (input) stream, downsample the decoded frames to a smaller size, and re-encode (recompress) the downsampled frames to a lower bit rate. However, this method can consume an extensive amount of the computational resources available on a transcoder. Because a transcoder is expected to conduct sessions with many different types of client devices, and to concurrently conduct as many sessions as possible, the straightforward method is impractical. Thus, it is desirable to develop fast and efficient transcoding methods to reduce the load on computational resources. The present invention provides a novel solution to this need.

DISCLOSURE OF THE INVENTION

Embodiments of the present invention pertain to a method and system for quickly and efficiently reducing the resolution of media data, thereby reducing the load on computational resources. In one embodiment, input data at a first resolution are received from a source. The input data are compressed. The input data are downsampled to generate compressed downsampled data at a reduced resolution. The compressed downsampled data are used to generate a frame at the reduced resolution. When the frame is needed as a reference for another frame, the compressed downsampled data are decoded to generate decompressed downsampled data at the reduced resolution. The decompressed downsampled data are upsampled to generate decompressed data at a resolution corresponding to the first resolution.

According to the various embodiments of the present invention, a larger amount of data is processed while the data are compressed. As such, data processing operations such as transcoding can be accomplished quickly and effectively while saving computing resources.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Figure 1A:
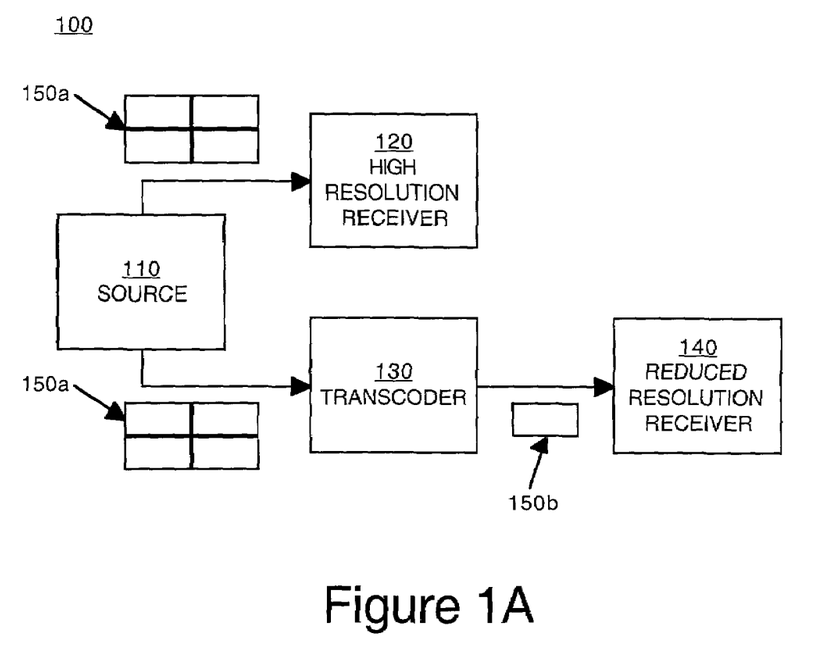
FIG. 1A is a block diagram of an exemplary hybrid wired/wireless network upon which embodiments of the present invention may be practiced.

FIG. 1A is a block diagram of an exemplary hybrid wired/wireless network 100 upon which embodiments of the present invention may be practiced. In hybrid wired/wireless network 100, media data (e.g., video, audio, image, graphic and/or Web page data) are streamed to fixed clients (stationary receiving nodes) via a wired link and to mobile clients (moving receiving nodes) via a wireless link.

In the present embodiment, hybrid wired/wireless network 100 includes a wired sender (source 110), a first client (wired high-resolution receiver 120), and a second client (wireless reduced-resolution receiver 140). In this embodiment, source 110 generates a full-bandwidth, high-resolution frame 150a that is sent to high-resolution receiver 120. A transcoder 130, placed at source 110, at reduced-resolution receiver 140, or at an intermediate node such as a wired/wireless gateway, transcodes the frame 150a into a lower-bandwidth and/or reduced-resolution frame 150b that is then sent to reduced-resolution receiver 140. In addition, the reduced resolution video can be transcoded to another video format. For example, source 110 could generate MPEG-1, MPEG-2 or H.263 video, then transcoder 130 transcodes the frame 150a into a lower-bandwidth and/or reduced-resolution frame 150b that is encoded in the MPEG-4 format and sent to receiver 140.

Figure 1B:
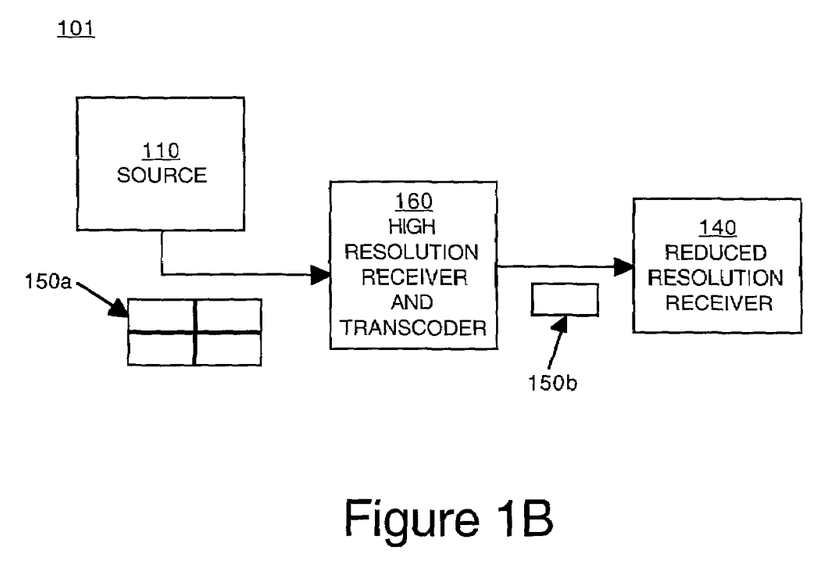
FIG. 1B is a block diagram of an exemplary wireless network upon which embodiments of the present invention may be practiced.

FIG. 1B is a block diagram of an exemplary wireless network 101 (e.g., a wireless appliance network) upon which embodiments of the present invention may be practiced. In typical wireless appliance networks, mobile senders and receivers (clients) communicate with one another over wireless links. A sender's coverage area is limited by the power of the transmitted signal. Relay devices can be used to extend the wireless coverage area when intended receivers are beyond the immediate coverage area of the sender. In the case of heterogeneous clients (e.g., receiving nodes having different display, power, computational, and communication characteristics and capabilities), transcoders can be used to adapt a data stream for a particular receiver or communication link. Transcoding can be performed in a relay device or in a receiver that also acts as a relay. Transcoding can also be performed by the sender or by the receiving node.

In the present embodiment, wireless network 101 includes a wireless sender (source 110), a high-resolution receiver and transcoder 160, and a reduced-resolution receiver 140. In wireless network 101, the high-resolution receiver 160 receives and transcodes the high-resolution frame 150a, and relays the resulting lower-bandwidth and/or reduced-resolution frame 150b to the reduced-resolution receiver 140.

Referring to FIGS. 1A and 1B, both hybrid wired/wireless network 100 and wireless network 101 use network transcoders to transcode frame 150a into lower bandwidth and/or reduced-resolution frame 150b that matches the display capabilities of the target wireless nodes (e.g., reduced-resolution receiver 140). Generally speaking, these networks illustrate how network transcoding can enable efficient use of wireless spectrum and receiver resources by transcoding media data into formats better suited for transmission over particular channels and for the capabilities of the receiving nodes.

Figure 2:
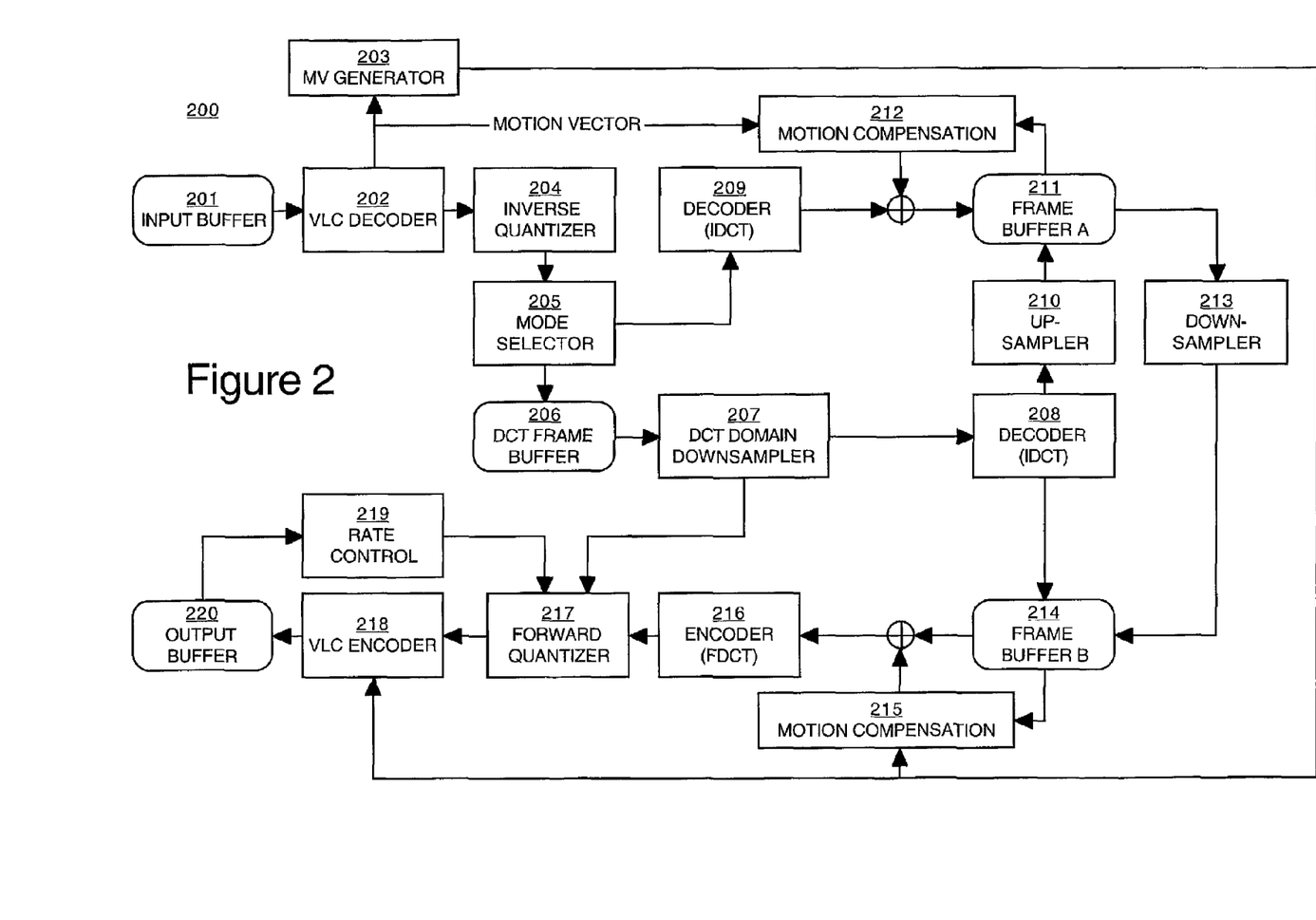
FIG. 2 illustrates data flow through a system for reducing the resolution of media data according to one embodiment of the present invention.

FIG. 2 illustrates data flow through the functional blocks of a system 200 (e.g., a transcoder) for reducing the resolution of media data according to one embodiment of the present invention. In this embodiment, system 200 is shown as a separate device that is situated in a network between the source and recipients of the media data. However, it is appreciated that system 200 may instead be integrated with the source of the media data or with the receiving (client) device. Also, although the functional blocks of system 200 are illustrated as separate elements, it is appreciated that one or more of the functional blocks may be combined into a single block, and that the functions of one or more blocks may be performed by a single hardware component or software module. For example, frame buffers A 211 and B 214 can share the same memory space.

In the present embodiment, the general flow of data through device 200 is from input buffer 201 to output buffer 220. Input buffer 201 receives compressed (encoded) input data from a data source. The data source may be a data storage device such as a magnetic or optical disk, or the input data may be streamed to system 200 from another device. Output data are also compressed, and the output data can be written to a data storage device or streamed to a client device via a wired and/or wireless network.

In the present embodiment, the input and output data include a plurality of frames comprising video data. The input data are at a first resolution and the output data are at a second resolution that is reduced relative to the first resolution. Each frame may be separated into macroblocks.

In one embodiment, the input data are MPEG (Moving Pictures Experts Group) video data. In the case of P-pictures and B-pictures, using techniques known in the art, a frame/macroblock is predicted from another frame (or macroblock) using a motion estimation technique. In the case of I-pictures, the frame/macroblock is independent of other frames/macroblocks. Because MPEG employs motion-compensated motion estimation and discrete cosine transform-based frequency domain compression techniques, embodiments of the present invention are described for videos compressed according to these techniques. For example, the reduced resolution transcoding can be performed for MPEG-1, MPEG-2, MPEG-4 and H.263 video data. However, other types of video compression schemes can be used in accordance with the various embodiments of the present invention.

From input buffer 201, variable length code (VLC) decoder 202 parses the input data stream. Motion vectors are passed to the motion compensation module 212 and to motion vector (MV) generator 203 to generate new motion vectors for the downscaled (reduced resolution) version of the data.

In one embodiment, MV generator 203 generates new motion vectors from the original motion vectors (that is, the new motion vectors are generated using the motion vectors from the input data in input buffer 201). In one such embodiment, MV generator 203 generates the new motion vectors by taking the average, or a weighted average, of the original motion vectors. One averaging approach is known in the art as the align-to-average weighting approach, another is known as the align-to-best predicted macroblock weighting approach, and another is known as the align-to-worst predicted macroblock weighting approach. Any of these approaches, or some other approach, may be used with the various embodiments of the present invention.

Continuing with reference to FIG. 2, in the present embodiment, the input data are compressed according to a discrete cosine transform-based compression scheme. In this embodiment, the discrete cosine transform (DCT) data are sent to inverse quantizer 204.

In the present embodiment, mode selector 205 determines, for each output macroblock, whether the macroblock is characterized as either a first or a second coding type. The first coding type is commonly referred to as "inter" while the second coding type is commonly referred to as "intra." An inter-macroblock (characterized as the first coding type) is dependent on the content of another macroblock. That is, an inter-macroblock is a predicted macroblock that is derived from another macroblock using motion information. An intra-macroblock (characterized as the second coding type) is independent of the content of another macroblock and does not contain any motion information.

Still referring to FIG. 2, in the present embodiment, mode selector 205 determines the number of input inter-macroblocks and the number of input intra-macroblocks in the set of macroblocks that are used to generate an output macroblock. Using a downsample-by-two operation as an example, four input macroblocks are used to generate one output macroblock; these four input macroblocks will include some combination of inter- and intra-macroblocks.

In accordance with the present embodiment of the present invention, if there are K input macroblocks involved in generating one output macroblock, a first threshold N and a second threshold M can be defined, where M<N<K. In the present embodiment, mode selector 205 decides that if at least M of the K input macroblocks are intra-macroblocks, then the output macroblock will be coded as an intra-macroblock. If less than M of the K input macroblocks are intra-blocks, the output macroblock will be coded as an inter-macroblock.

Furthermore, according to the present embodiment of the present invention, if the output macroblock is to be coded as an intra-macroblock, then the value of N is used to determine what data processing (transcoding) functions will be used. That is, in one embodiment, if M to N−1 input macroblocks are intra-macroblocks, a first sequence of data processing functions are employed (referred to herein as Case 1); if N to K−1 input macroblocks are intra-macroblocks, a second sequence of data processing functions are employed (referred to herein as Case 2); and if all K input macroblocks are intra-macroblocks, then a third sequence of data processing functions are employed (referred to herein as Case 3). Additional information is provided in conjunction with FIGS. 4B and 4C, below. FIGS. 4B and 4C also illustrate the sequence of data processing functions employed when the output macroblock is to be coded as an inter-macroblock (referred to herein as Case 4).

In the present embodiment, for Cases 2 and 3, mode selector 205 of FIG. 2 directs the compressed input data to DCT frame buffer 206. DCT domain downsampler 207 generates downsampled DCT data. For the macroblocks generated by DCT domain downsampling, inverse DCT (IDCT) is performed by decoder 208, and the result is saved in frame buffer B 214. Furthermore, an upsampler 210 upsamples the decompressed (IDCT) data to generate a reconstructed version of the input data that is at the initial (first) resolution of the input data. The reconstructed version is saved in frame buffer A 211.

In the present embodiment, for Cases 1 and 4, the DCT data are directed by mode selector 205 to decoder 209. The decompressed (decoded) data are motion compensated (motion compensation 212) if the data are for an inter-macroblock, and the results are saved in frame buffer A 211. The data in frame buffer A 211 are then downsampled in downsampler 213, and the results are stored in frame buffer B 214.

In the present embodiment, the data in frame buffer A 211 are used to reconstruct future frames at the first (original) resolution. The data in frame buffer B 214 are used to generate a new residual based on the new motion vector from MV generator 203 (motion compensation 215). The residual is encoded (forward DCT, or FDCT) in encoder 216 and sent to forward quantizer 217 along with the data generated directly by DCT domain downsampler 207. In the present embodiment, the step size of the quantizer is controlled by rate control 219 in order to achieve a specified (target) output bit rate. VLC encoder 218 then generates the output bit stream.

In one embodiment, rate control 219 determines the quantizer step size using information from the compressed input data. In this embodiment, rate control 219 first estimates the number of bits available to code the data from encoder 216 and DCT domain downsampler 207. Rate control 219 then computes a reference value of the quantization parameter based on the fullness of output buffer 220 and the target bit rate. Next, rate control 219 derives the value of the quantization parameter from the reference value and according to the spatial activity derived from the DCT coefficient activity in the input data. In essence, the DCT coefficient activity refers to the variation in the pixel domain block.

Thus, according to the various embodiments of the present invention, frame buffer A 211 stores reconstructed macroblocks at the first resolution (the original resolution of the input data), and frame buffer B 214 stores downsampled versions (at a second resolution that is reduced relative to the first resolution). The original frames are reconstructed either by full decoding and IDCT and then motion compensation, or by upsampling the downsampled DCT version. In one embodiment, the upsampling is only performed when the original (pixel domain) frame is needed as a reference for another frame. Similarly, the output of system 200 is either encoded from the downsampled pixel domain version through motion compensation (using the new motion vectors generated by MV generator 203), or directly from the downsampled DCT version. Mode selector 205 functions to direct which data processing (transcoding) functions are employed to accomplish the above.

Figure 3:
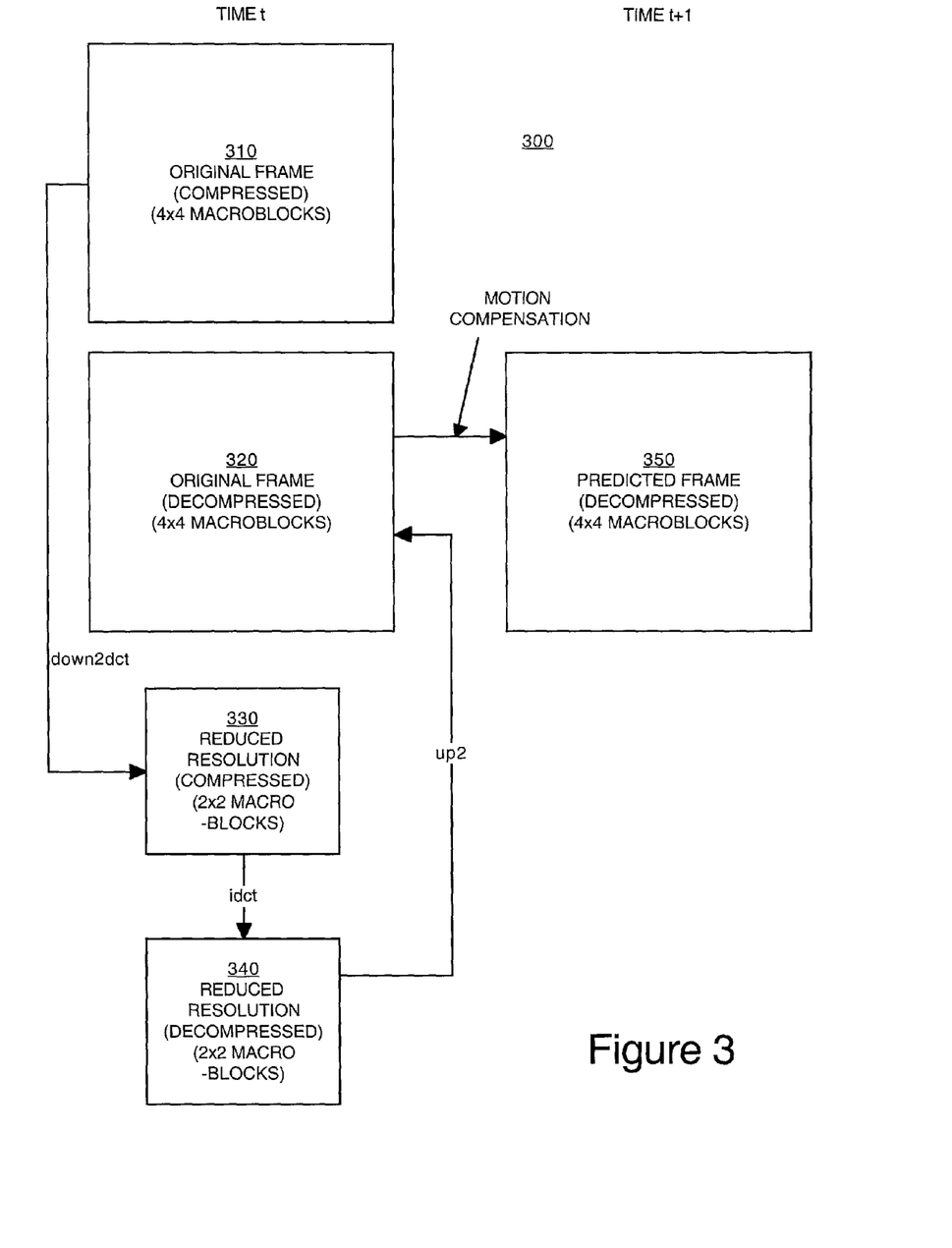
FIG. 3 illustrates a method for processing media data according to one embodiment of the present invention.

FIG. 3 illustrates a data flow 300 for reducing the resolution of media data according to one embodiment of the present invention. The embodiment illustrated by FIG. 3 is generally applicable to I-pictures; for P-pictures, to Cases 2 and 3 that were described above (e.g., if N to K−1 input macroblocks are intra-macroblocks, or if all K input macroblocks are intra-macroblocks, and the output macroblock is an intra-macroblock); and for B-pictures, to Cases 2 and 3, but only the down2dct operation is needed from frame 310 to frame 330. It is appreciated that the operations illustrated in FIG. 3 can be combined with other data processing operations, as will be seen by FIGS. 4A, 4B and 4C, below. In one embodiment, the operations of FIG. 3 are performed using a transcoder such as that described by FIG. 2.

FIG. 3 depicts the flow of data at two consecutive times (t and t+1). At time t, an original data frame 310 is received. The data included in frame 310 have been compressed. For simplicity of discussion, frame 310 is described as comprising 4×4 macroblocks; however, it is understood that an array of macroblocks may have different dimensions.

According to the present embodiment of the present invention, down2dct (downsample-by-two in the DCT domain) operations are performed on the data in frame 310 while the data are still compressed. As such, frame 330 comprises compressed data in 2×2 macroblocks. Next, idct (inverse DCT)

operations are then performed to decode the data. Thus, frame 340 comprises decompressed data in 2×2 macroblocks.

In the present embodiment, up2 (upsample-by-two) operations are performed on the data in frame 340 to generate a frame 320 comprising decompressed data 4×4 macroblocks. The resolution of frame 320 thus corresponds to the resolution of the original frame 310. In one embodiment, the resolution of frame 320 is equivalent to the resolution of the original frame 310. Frame 320 can be used to predict frame 350 (at time t+1) using motion compensation and motion estimation.

Thus, in the embodiment of FIG. 3, four down2dct operations, four idct operations, and one upsample-by-two operations are needed to generate frame 320 from frame 310. In the conventional art, 16 idct operations would be needed to accomplish the same task. In general, in comparison to the conventional art, the number of idct operations needed according to the various embodiments of the present invention is $1/(DF)^2$, where DF represents the downsampling factor. Thus, for a downsample-by-two operation, one-fourth the number of idct operations are needed relative to the conventional art.

The computational effort associated with a down2dct is roughly equivalent to the computational effort associated with an idct operation, while an upsample-by-two operation is relatively insignificant. Thus, for a downsample-by-two case, the computational effort is reduced by approximately 50 percent. The savings in computational effort is even greater for downsample-by-three and downsample-by-four cases.

In general, according to the present embodiment of the present invention, a transcoding session is considered at the macroblock level. For N to K input intra-macroblocks and an output intra-macroblock, downsampling in the compressed (e.g., DCT) domain is directly applied to generate a downsampled output macroblock. However, because in some instances the frame at original resolution is needed as a reference frame for predicting other frames, the original frame is generated by upsampling the downsampled version. The upsampled frame (e.g., frame 320 of FIG. 3) is an approximation of the original frame (e.g., frame 310 of FIG. 3); however, there is a negligible loss in quality.

Figure 4A:
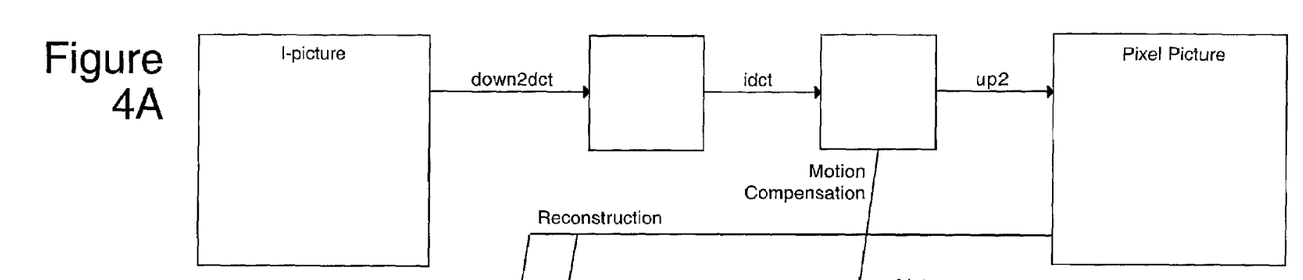
FIG. 4A illustrates data processing operations for an I-picture frame according to one embodiment of the present invention.
Figures 4B, 4C:
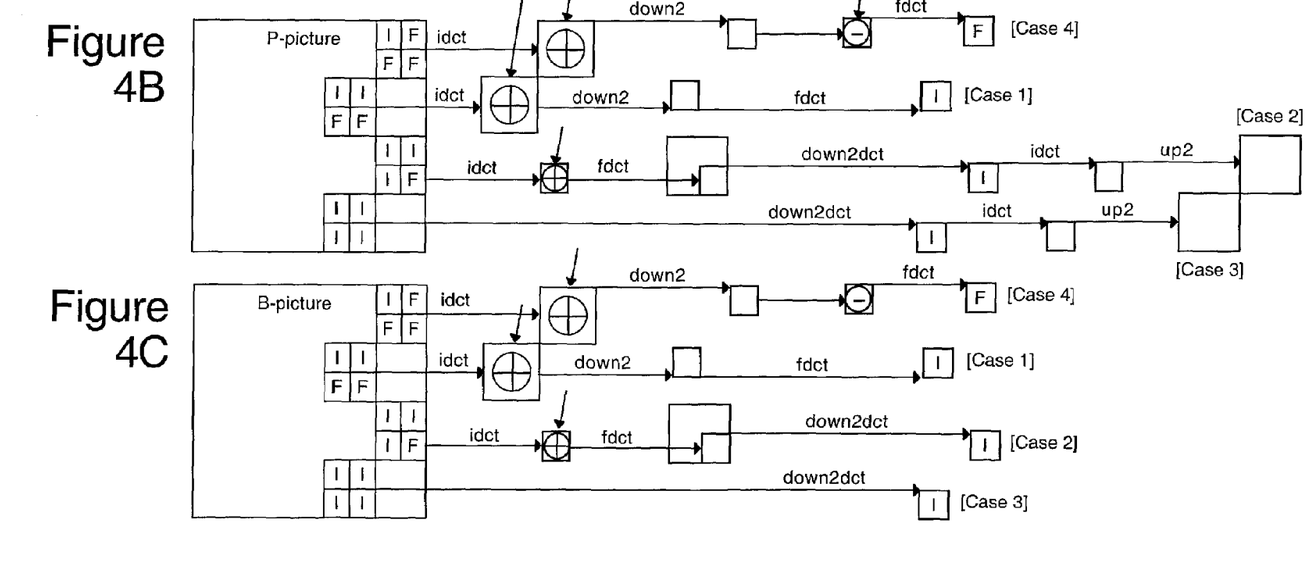
FIG. 4B illustrates data processing operations for a P-picture frame according to one embodiment of the present invention.
FIG. 4C illustrates data processing operations for a B-picture frame according to one embodiment of the present invention.

FIG. 4A illustrates data processing operations for an I-picture frame according to one embodiment of the present invention. For an I-picture, downsampling in the compressed domain (down2dct) is performed, followed by a decoding (idct). A pixel domain version of the I-picture may be needed as a reference for P-pictures and B-pictures, and in those cases, an upsampling operation (up2) is performed to approximate the initial version of the frame at the initial (first) resolution.

FIG. 4B illustrates data processing operations for a P-picture frame according to one embodiment of the present invention. For simplicity of illustration and discussion, FIG. 4B illustrates the case in which input macroblocks are considered as a 4×4 array; however, it is appreciated that an array of macroblocks may have different dimensions.

Each macroblock is identified as an intra-macroblock (I) or as an inter-macroblock (F). As described above, a mode-decision module (e.g., mode selector 205 of FIG. 2) determines whether the output macroblock is coded as an inter-macroblock or as an intra-macroblock, depending on the composition of the array of input macroblocks. Specifically, a threshold value M is specified, and the coding type of the output macroblock is selected accordingly. In the present embodiment, for an array of K input macroblocks, if at least M input macroblocks are intra-macroblocks, then the output macroblock is coded as an intra-macroblock; otherwise, the output macroblock is coded as an inter-macroblock. Furthermore, in the present embodiment, a threshold value N is specified. Depending on the actual number of input intra-macroblocks, the value of N determines which data processing operations will be applied.

The values of M and N are a design choice. For K=4, a value of M=2 and N=3 have proven to be efficient. For K=16, for M=9, a value of N=12 has proven to be efficient.

FIG. 4B illustrates the four cases possible when the input macroblocks are considered as a 4×4 array (K=4, M=2, N=3). These four cases are referred to as:

IFFF-F: This corresponds to Case 4 described above. This pertains to the case in which the output macroblock is coded as an inter-macroblock because there is only a single input intra-macroblock. Note this is also applicable to a case in which the input macroblocks are coded as FFFF (that is, in which all of the input macroblocks are inter-macroblocks).

IIFF-I: This corresponds to Case 1 described above. This pertains to a case in which the output macroblock is coded as an intra-macroblock.

IIIF-I: This corresponds to Case 2 described above. This pertains to a case in which the output macroblock is coded as an intra-macroblock.

IIII-I: This corresponds to Case 3 described above. This pertains to a case in which the output macroblock is coded as an intra-macroblock.

Note that the arrangement of the symbols (I or F) in FIG. 4B, as well as in FIG. 4C, are not meant to convey an exact order to the various arrays of input macroblocks, but instead are meant to convey the number of each type of input macroblock in a combination. That is, for example, IIFF-I also represents IFIF-I as well as all of the other possible combinations.

Continuing with reference to FIG. 4B, for Case 4, in the present embodiment, the input macroblocks are reconstructed (that is, the corresponding macroblocks in the I-picture are decompressed [idct] and constructed using motion estimation). The result is downsampled-by-two (down2) to generate an output block in the pixel domain (decompressed). A residual is generated based on the motion vector obtained from the input data. The output block in the pixel domain is then encoded according to a forward discrete cosine transform (fdct) process. As an alternative to the fdct process, a compressed (e.g., DCT) domain motion compensation process can be used.

For Case 1 of FIG. 4B, in the present embodiment, each of the input macroblocks is reconstructed whether it is an intra-macroblock or not. The result is downsampled-by-two to generate a pixel domain output macroblock. This macroblock is then encoded (fdct) to generate an output intra-macroblock. As an alternative to the fdct process, a compressed (e.g., DCT) domain motion compensation process can be used.

For Case 2 of FIG. 4B, in the present embodiment, only the input inter-macroblock is reconstructed (for clarity of the illustration, an arrow connecting the pixel picture of FIG. 4A to the reconstruction block of Case 2 of FIG. 4B, as well as to the reconstruction blocks of Cases 1, 2 and 4 of FIG. 4C, is not shown). A compressed version of the four input macroblocks is then generated through a fdct process. As an alternative to the fdct process, a compressed (e.g., DCT) domain motion compensation process can be used. The four macroblocks are used to construct a compressed output macroblock through a down2dct process. In one embodiment, the output macroblock can be decoded (idct) and upsampled (up2) for possible use as a reference frame for P-pictures and/or B-pictures in the GOP (group of pictures).

For Case 3 of FIG. 4B, in the present embodiment, an output macroblock is constructed through a down2dct process applied to all four of the input macroblocks. In one embodiment, the output macroblock can be decoded (idct) and upsampled (up2) for possible use as a reference frame for P-pictures and/or B-pictures in the GOP.

FIG. 4C illustrates data processing operations for a B-picture frame according to one embodiment of the present invention. In the present embodiment, the processing of B-pictures is similar to that of P-pictures, as described in conjunction with FIG. 4B. However, because B-pictures are not used as reference frames in the GOP, for Cases 2 and 3 of FIG. 4C, the decode (idct) and upsample (up2) processes do not need to be performed.

As mentioned above, although FIGS. 4B and 4C are described for the case in which K=4, the features of the present invention can be extended to other values of K. For larger values of K, larger downsampling factors can be used. For example, for K=16, a downsample-by-four operation can be used. Because a downsample-by-four operation involves many more possible combinations of input macroblocks (relative to K=4, for example), further optimizations of the transcoding process may be achieved by considering the locations of the intra-macroblocks in the array of input macroblocks.

Figure 5:
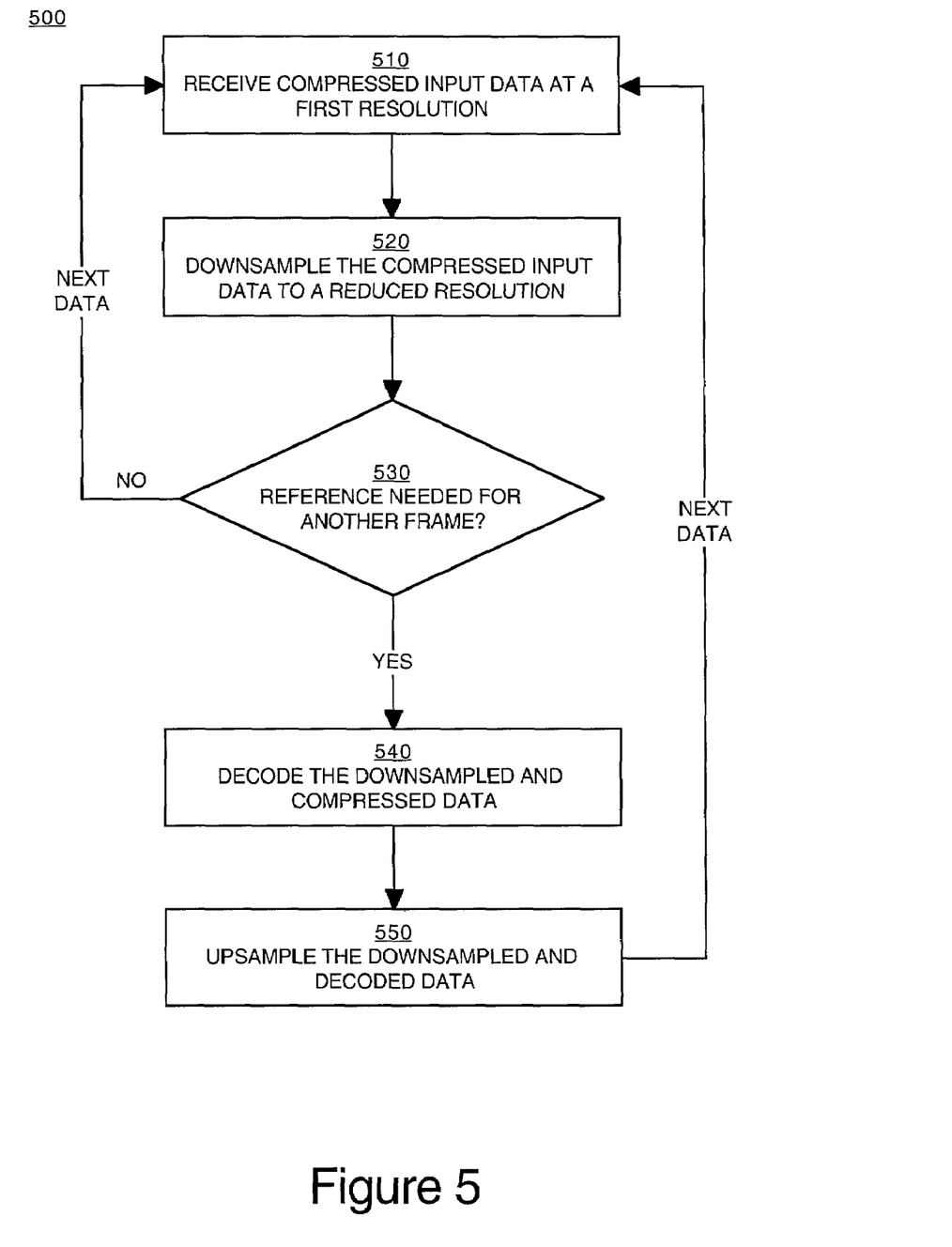
FIG. 5 is a flowchart of one embodiment of a method for reducing the resolution of media data in accordance with the present invention.

FIG. 5 is a flowchart 500 of one embodiment of a method for reducing the resolution of media data in accordance with the present invention. Flowchart 500 includes processes of the present invention that, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device.

In step 510, in the present embodiment, compressed data at a first resolution are received. In step 520, a downsampling operation is performed on the compressed data to reduce the resolution of the data. In step 530, if the compressed downsampled data are not needed as a reference for another frame, then flowchart 500 returns to step 510. Otherwise, flowchart 500 proceeds to step 540.

In step 540, in the present embodiment, the compressed downsampled data are decoded. In step 550, the decompressed downsampled data are upsampled to a resolution that corresponds to the initial resolution of the input data. In one embodiment, the decompressed downsampled data are upsampled to a resolution equivalent to (or substantially equivalent to) the initial resolution of the input data. Flowchart 500 then returns to step 510 for processing of the next input data.

Figure 6:
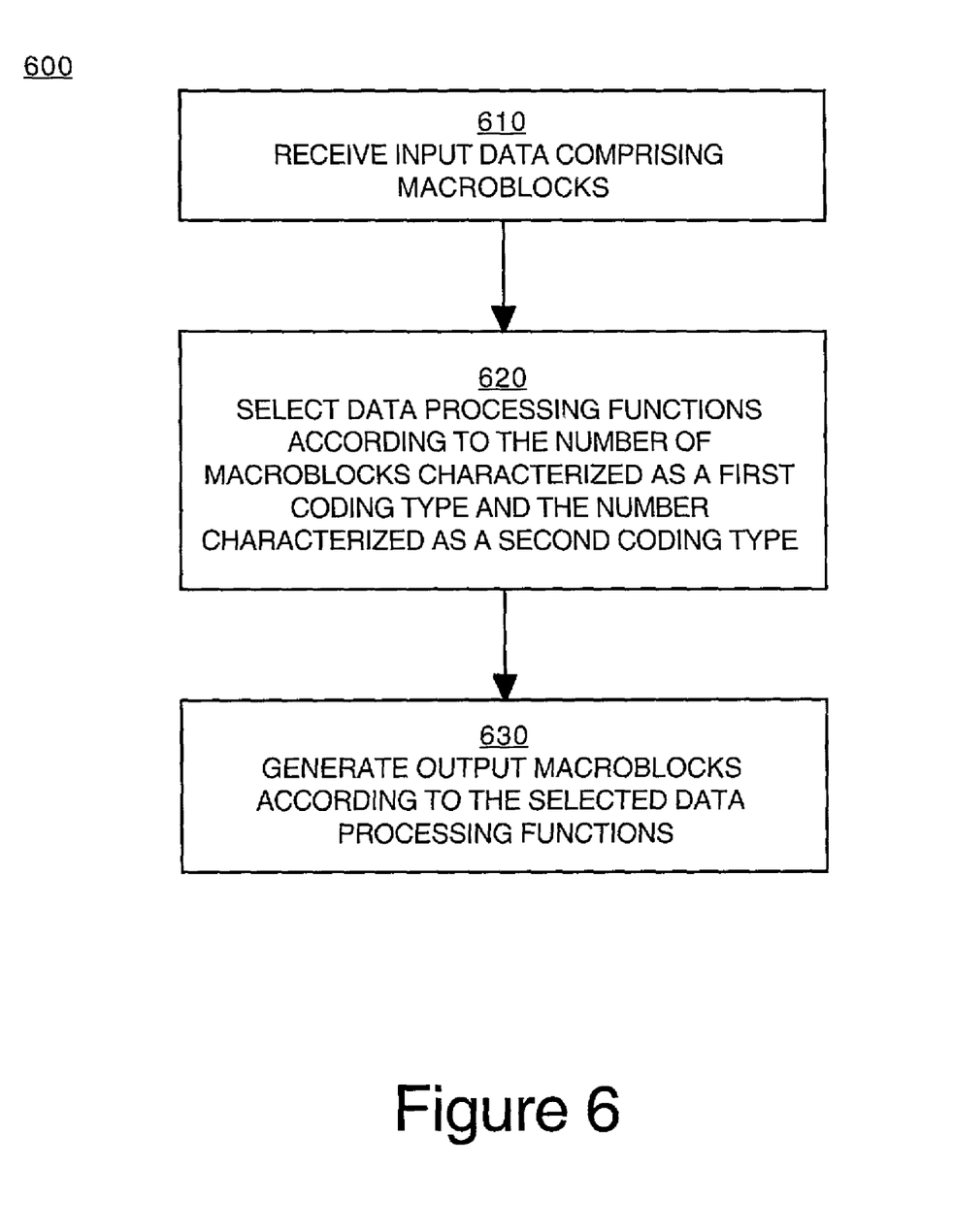
FIG. 6 is a flowchart of another embodiment of a method for reducing the resolution of media data in accordance with the present invention.

FIG. 6 is a flowchart 600 of another embodiment of a method for reducing the resolution of media data in accordance with the present invention. Flowchart 600 includes processes of the present invention that, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device.

In step 610, in the present embodiment, input data comprising a number of macroblocks are received. Each of the macroblocks is characterized as either a first coding type or as a second coding type. Thus, the input data will include either all macroblocks of a first coding type, all macroblocks of a second coding type, or some combination of macroblocks of the first and second coding types.

In step 620, in the present embodiment, data processing functions are selected according to the number of input macroblocks characterized as the first coding type and the number of input macroblocks characterized as the second coding type. In one embodiment, the coding types of the input macroblocks are used to determine the coding type of an output macroblock derived from the input macroblocks. In this latter embodiment, the data processing functions are selected according to the coding type of the output macroblock.

In step 630 of FIG. 6, in the present embodiment, output macroblocks are generated according to the selected data processing functions. In one embodiment, the data processing functions include those described in conjunction with FIGS. 4A and 5 above. In other embodiments, the data processing functions include those described in conjunction with FIGS. 4B and 4C above.

In summary, in its various embodiments, the present invention provides a fast and efficient transcoding method to reduce the load on computational resources. A hybrid approach is used to take advantage of compressed domain processing techniques. That is, a greater number of data processing functions are performed in the compressed domain, with attendant increases in processing speed and decreases in computational effort, and with negligible effects on quality.

The preferred embodiment of the present invention, reducing the resolution of media data, is thus described. While the present invention has been described in particular embodiments, it should be appreciated that the present invention should not be construed as limited by such embodiments, but rather construed according to the following claims.

What is claimed is:

1. A method for reducing the resolution of media data, said method comprising:

accessing compressed input data for a frame of a plurality of frames at a transcoder device, wherein said frame is at a first resolution and comprises a plurality of macroblocks, wherein said plurality of macroblocks comprises a plurality of subsets of macroblocks that are to be encoded as a single output macroblock;

selecting a data processing function at said transcoder device according to the number of macroblocks in a subset of said plurality of subsets that are characterized as intra-coded, wherein said selecting is performed for each of said plurality of subsets;

if all of said macroblocks in said subset are characterized as intra-coded, downsampling said subset of macroblocks at said transcoder device in a compressed domain to generate said single output macroblock comprising compressed downsampled data at a second resolution that is reduced relative to said first resolution;

if less than all of said macroblocks in said subset are characterized as intra-coded and if said number of macroblocks in said subset characterized as intra-coded satisfies said threshold, decompressing only macroblocks of said subset of macroblocks at said transcoder device that are not intra-coded, compressing said subset of macroblocks at said transcoder device, and downsampling said subset of macroblocks at said transcoder device in said compressed domain to generate said single output macroblock comprising compressed downsampled data at said second resolution that is reduced relative to said first resolution;

if said number of macroblocks in said subset characterized as intra-coded does not satisfy said threshold, decompressing said subset of macroblocks at said transcoder device, downsampling said subset of macroblocks at said transcoder device, and encoding said subset of macroblocks at said transcoder device to generate said output macroblock comprising compressed downsampled data at said second resolution that is reduced relative to said first resolution, wherein said accessing, said selecting and said downsampling are performed prior to transmitting over a wireless network; and transmitting said output macroblock comprising compressed downsampled data from said transcoder device to a wireless device over said wireless network.

2. The method as recited in claim 1 wherein said input data comprise motion vectors, wherein said method comprises:

generating motion vectors at said transcoder device for said frame at said second resolution using said motion vectors from said input data.

3. The method as recited in claim 2 wherein said motion vectors for said frame at said second resolution are generated by averaging said motion vectors from said input data.

4. The method as recited in claim 1 wherein said input data are compressed according to a discrete cosine transform-based compression scheme, wherein said input data comprise discrete cosine transform (DOT) coefficients.

5. The method as recited in claim 4 comprising:

generating an output data stream at said transcoder device comprising said frame at said second resolution; and determining a bit rate at said transcoder device for said output data stream using said DCT coefficients from said input data.

6. The method as recited in claim 5 wherein said input data are encoded according to a first compression scheme and said output data stream are encoded according to a second compression scheme.

7. The method as recited in claim 1 wherein said media data are selected from the group consisting of: video data, audio data, image data, graphic data, and web page data.

8. A method for reducing the resolution of media data, said method comprising:

accessing input data comprising compressed data for a plurality of macroblocks at a transcoder device, wherein said plurality of macroblocks comprises a plurality of subsets of macroblocks that are to be encoded as a single output macroblock and wherein a macroblock is characterized as a first coding type if said macroblock is dependent on a macroblock from a reference frame and is otherwise characterized as a second coding type;

selecting data processing functions at said transcoder device according to the number of macroblocks in a subset of said plurality of subsets that are characterized as said first coding type and also according to the number of macroblocks in said subset that are characterized as said second coding type, wherein at least one of said processing functions comprises downsampling compressed data in the discrete cosine transform (DOT) domain and wherein at least one of said processing functions comprises decoding compressed data prior to downsampling decoded data, wherein said selecting is performed for each of said plurality of subsets;

generating said output macroblock at said transcoder device from said plurality of macroblocks using said data processing functions, said output macroblock providing a reduced resolution relative to said input data, wherein said accessing, selecting and generating are performed prior to transmitting over a wireless network; and transmitting said output macroblock comprising compressed downsampled data from said transcoder device to a wireless device over said wireless network.

9. The method as recited in claim 8 comprising:

determining a coding type for said output macroblock at said transcoder device according to the number of macroblocks characterized as said first coding type and the number of macroblocks characterized as said second coding type; and selecting said data processing functions at said transcoder device according to said coding type of said output macroblock.

10. The method as recited in claim 9 wherein, if said output macroblock is characterized as said first coding type, said data processing functions comprise:

constructing a predicted macroblock for each macroblock in said subset of macroblocks by applying motion compensation to a respective macroblock in a reference frame at said transcoder device, wherein said constructing comprises a decoding function such that said predicted macroblocks comprise decompressed data;

downsampling predicted macroblocks at said transcoder device to generate a downsampled macroblock; and encoding said downsampled macroblock at said transcoder device to generate said output macroblock.

11. The method as recited in claim 8 wherein, if all of said plurality of macroblocks are characterized as said second coding type, said data processing functions comprise:

downsampling said subset of macroblocks at said transcoder device to generate said output macroblock comprising compressed downsampled data.

12. The method as recited in claim 11 comprising:

decoding said compressed downsampled data at said transcoder device to generate decompressed downsampled data; and upsampling said decompressed downsampled data at said transcoder device.

13. The method as recited in claim 8 wherein, if the number of macroblocks in said subset characterized as said second coding type satisfies a first threshold, said data processing functions comprise:

constructing a predicted macroblock for each macroblock in said subset of macroblocks characterized as said first coding type by applying motion compensation to a respective macroblock in a reference frame at said transcoder device, wherein said constructing comprises a decoding function such that a predicted macroblock comprises decompressed data;

encoding each predicted macroblock at said transcoder device; and downsampling predicted macroblocks and said macroblocks characterized as said second coding type at said transcoder device to generate said output macroblock comprising compressed downsampled data.

14. The method as recited in claim 13 comprising:

decoding said compressed downsampled data at said transcoder device to generate decompressed downsampled data; and upsampling said decompressed downsampled data at said transcoder device.

15. The method as recited in claim 8 wherein said input data comprise motion vectors, said method comprising:

generating a motion vector for said output macroblock by averaging said motion vectors at said transcoder device.

16. The method as recited in claim 8 wherein said input data are compressed according to a discrete cosine transform-based compression scheme.

17. The method as recited in claim 16 comprising:
generating a quantization parameter at said transcoder device for said output macroblock using quantization parameters for said plurality of macroblocks.

18. A system for reducing the resolution of media data, said system comprising:
an input buffer adapted to receive compressed input data at a first resolution, said compressed input data comprising data for a plurality of macroblocks, wherein said plurality of macroblocks comprises a plurality of subsets of macroblocks that are to be encoded as a single output macroblock and wherein a macroblock is characterized as a first coding type if said macroblock is dependent on a macroblock from another frame and is otherwise characterized as a second coding type;
a mode selector coupled to said input buffer, said mode selector adapted to select a data processing function according to the number of macroblocks in a subset of said plurality of subsets that are characterized as said first coding type and the number of macroblocks in said subset that characterized as said second coding type, wherein said selecting is performed for each of said plurality of subsets;
a downsampler coupled to said mode selector, said downsampler adapted to downsample said compressed input data and generate compressed downsampled data at a second resolution that is reduced relative to said first resolution;
a relay coupled to said mode selector, said relay adapted to transmit said compressed downsampled data to a wireless device over said wireless network, wherein said subset of macroblocks is directed by said mode selector to said downsampler if less than all of said macroblocks in said subset are characterized as intra-coded and if said number of macroblocks characterized as intra-coded exceeds a threshold, wherein otherwise said subset of macroblocks is directed by said mode selector to said relay; and
a decoder coupled to said wireless device, said decoder adapted to decode said compressed input data and generate decompressed data.

19. The system of claim 18 comprising:
a motion vector generator coupled to said input buffer, said motion compensator adapted to generate motion vectors for a frame at said second resolution using motion vectors from said input data.

20. The system of claim 18 comprising:
a rate controller coupled to said input buffer, said rate controller adapted to determine a quantization step size for a frame at said second resolution according to quantization parameters from said input data.

21. The system of claim 18 wherein said input data are compressed according to a discrete cosine transform-based compression scheme, wherein said input data comprise discrete cosine transform (DOT) coefficients.

22. The system of claim 18 wherein said media data are selected from the group consisting of: video data, audio data, image data, graphic data, and web page data.

23. A computer-readable storage medium having computer-readable program code embodied therein for causing a computer system to perform a method comprising:
accessing compressed input data residing in a buffer, said compressed input data comprising compressed data for a frame of a plurality of frames, wherein said frame is at a first resolution and comprises a plurality of macroblocks, wherein said plurality of macroblocks comprises a plurality of subsets of macroblocks that are to be encoded as a single output macroblock;
selecting a data processing function according to the number of macroblocks in a subset of said plurality of subsets that are characterized as intra-coded, wherein said selecting is performed for each of said plurality of subsets;
if all of said macroblocks in said subset are characterized as intra-coded, downsampling said subset of macroblocks in a compressed domain to generate said single output macroblock comprising compressed downsampled data at a second resolution that is reduced relative to said first resolution;
if less than all of said macroblocks in said subset are characterized as intra-coded and if said number of macroblocks in said subset characterized as intra-coded satisfies said threshold, decoding only macroblocks of said subset of macroblocks that are not intra-coded, encoding said subset of macroblocks, and downsampling said subset of macroblocks in said compressed domain to generate said single output macroblock comprising compressed downsampled data at said second resolution that is reduced relative to said first resolution;
decoding said compressed downsampled data to generate decompressed downsampled data at said second resolution;
upsampling said decompressed downsampled data to generate decompressed data at a resolution corresponding to said first resolution, said decoding and said upsampling performed only if said decompressed data are needed as a reference for another frame, wherein said accessing, selecting, downsampling and upsampling are performed prior to transmitting over a wireless network; and
transmitting said output macroblock comprising compressed downsampled data to a wireless device over said wireless network.

24. The computer-readable storage medium of claim 23 wherein said computer-readable program code embodied therein causes a computer system to perform a method comprising:
accessing motion vectors for said frame at said first resolution; and
deriving motion vectors for said frame at said second resolution from said motion vectors for said frame at said first resolution.

25. The computer-readable storage medium of claim 24 wherein said motion vectors for said frame at said second resolution are generated by averaging said motion vectors for said frame at said first resolution.

26. The computer-readable storage medium of claim 23 wherein said input data are compressed according to a discrete cosine transform-based compression scheme, wherein said input data comprise discrete cosine transform (DCT) coefficients.

27. The computer-readable storage medium of claim 23 wherein said computer-readable program code embodied therein causes a computer system to perform a method comprising:
accessing quantization parameters for said frame at said first resolution; and
deriving quantization parameters for said frame at said second resolution from said quantization parameters for said frame at said first resolution.

* * * * *

UNITED STATES PATENT AND TRADEMARK OFFICE
CERTIFICATE OF CORRECTION

PATENT NO.       : 7,596,179 B2                              Page 1 of 1
APPLICATION NO.  : 10/085684
DATED            : September 29, 2009
INVENTOR(S)      : Bo Shen et al.

It is certified that error appears in the above-identified patent and that said Letters Patent is hereby corrected as shown below:

In column 11, line 24, in Claim 4, delete "(DOT)" and insert -- (DCT) --, therefor.

In column 11, line 56, in Claim 8, delete "(DOT)" and insert -- (DCT) --, therefor.

In column 13, line 55, in Claim 21, delete "(DOT)" and insert -- (DCT) --, therefor.

Signed and Sealed this
Twentieth Day of December, 2011

David J. Kappos
*Director of the United States Patent and Trademark Office*